(12) United States Patent
Zapp Glauser

(10) Patent No.: US 8,895,094 B2
(45) Date of Patent: *Nov. 25, 2014

(54) PROCESSING AND COOKING OF FOOD WITH A LOW GLYCEMIC IMPACT FOR THE NUTRITION OF DIABETICS, OBESE AND FOR WEIGHT REDUCING DIETS

(71) Applicant: Jorge Luis Zapp Glauser, Bogota (CO)

(72) Inventor: Jorge Luis Zapp Glauser, Bogota (CO)

( * ) Notice: Subject to any disclaimer, the term of this patent is extended or adjusted under 35 U.S.C. 154(b) by 0 days.

This patent is subject to a terminal disclaimer.

(21) Appl. No.: 13/739,467

(22) Filed: Jan. 11, 2013

(65) Prior Publication Data
US 2013/0142932 A1   Jun. 6, 2013

Related U.S. Application Data

(62) Division of application No. 12/661,160, filed on Mar. 11, 2010, now abandoned.

(30) Foreign Application Priority Data

Mar. 16, 2009   (CO) .................................. 09-027012

(51) Int. Cl.
| | |
|---|---|
| A23L 1/29 | (2006.01) |
| A21D 8/06 | (2006.01) |
| A21C 1/12 | (2006.01) |
| A23L 1/01 | (2006.01) |
| A23L 1/00 | (2006.01) |
| B02C 7/00 | (2006.01) |
| A21D 2/36 | (2006.01) |
| A21D 2/26 | (2006.01) |
| A21D 13/02 | (2006.01) |
| A21D 13/00 | (2006.01) |
| A23L 1/10 | (2006.01) |
| A23L 1/16 | (2006.01) |
| A23L 1/216 | (2006.01) |
| A23L 1/212 | (2006.01) |

(52) U.S. Cl.
CPC ... *A21D 8/06* (2013.01); *A21C 1/12* (2013.01); *A23L 1/0128* (2013.01); *A23L 1/0029* (2013.01); *A23L 1/0135* (2013.01); *B02C 7/00* (2013.01); *A21D 2/362* (2013.01); *A21D 2/265* (2013.01); *A21D 13/02* (2013.01); *A21D 2/262* (2013.01); *A21D 13/007* (2013.01); *A23L 1/0121* (2013.01); *A23L 1/1025* (2013.01); *A23L 1/1041* (2013.01); *A23L 1/16* (2013.01); *A23L 1/216* (2013.01); *A23L 1/293* (2013.01); *A23V 2002/00* (2013.01); *A23L 1/212* (2013.01)
USPC .......... 426/243; 426/103; 426/305; 426/550; 426/558; 426/518; 426/523

(58) Field of Classification Search
CPC ...... A21C 1/12; A23L 1/0029; A23L 1/0128; A23L 1/0135; A23L 1/0255; A23L 1/1041; A23L 1/16; A23L 1/30; A23L 1/305; B02C 7/00; B02C 7/17; B02C 7/18–7/188; B02C 9/00–9/04; A21D 2/262; A21D 2/265; A21D 2/362; A21D 8/06; A21D 13/02
USPC ........... 426/89, 103, 302, 305, 653, 656–661, 426/523, 518, 243, 550, 558
See application file for complete search history.

(56) References Cited

U.S. PATENT DOCUMENTS

| | | | | |
|---|---|---|---|---|
| 3,952,958 | A * | 4/1976 | Rich | 241/162 |
| 3,962,416 | A * | 6/1976 | Katzen | 424/493 |
| 4,415,596 | A * | 11/1983 | Andersen et al. | 426/103 |
| 4,495,214 | A * | 1/1985 | Seltzer et al. | 426/557 |
| 5,128,166 | A * | 7/1992 | Babines et al. | 426/557 |
| 5,418,010 | A * | 5/1995 | Janda et al. | 427/213.31 |
| 5,756,136 | A * | 5/1998 | Black et al. | 426/89 |
| 5,875,978 | A * | 3/1999 | Wingler et al. | 241/55 |
| 6,322,827 | B1 * | 11/2001 | Scott et al. | 426/2 |
| 2004/0047977 | A1 * | 3/2004 | Lee | 426/658 |
| 2005/0031773 | A1 * | 2/2005 | Schmidt | 426/656 |
| 2005/0106296 | A1 * | 5/2005 | Merrill et al. | 426/302 |
| 2005/0118326 | A1 * | 6/2005 | Anfinsen et al. | 426/658 |
| 2005/0271787 | A1 * | 12/2005 | Doud et al. | 426/557 |
| 2006/0035010 | A1 * | 2/2006 | Jones | 426/660 |
| 2006/0138256 | A1 * | 6/2006 | Horigane et al. | 241/23 |
| 2006/0240173 | A1 * | 10/2006 | Schmidt | 426/656 |
| 2007/0098866 | A1 * | 5/2007 | Waller et al. | 426/549 |
| 2007/0104855 | A1 * | 5/2007 | Arndt et al. | 426/622 |
| 2007/0148302 | A1 * | 6/2007 | Villota et al. | 426/557 |
| 2007/0172575 | A1 * | 7/2007 | Gune | 426/641 |
| 2007/0275121 | A1 * | 11/2007 | Malby | 426/19 |
| 2008/0020121 | A1 * | 1/2008 | Dohl et al. | 426/563 |
| 2009/0238885 | A1 * | 9/2009 | Alting et al. | 424/491 |

* cited by examiner

*Primary Examiner* — Drew Becker
(74) *Attorney, Agent, or Firm* — Richards Patent Law P.C.

(57) ABSTRACT

To reduce the glycemic load in the daily nutrition of diabetics, obese and for weight-reducing diets, this invention claims cooking or baking processes and other procedures for food—rich in carbohydrates—in which the structure of the raw complex carbohydrates is mostly preserved and/or short saccharides are encapsulated. This objective is attained by reducing the magnitude of the complex carbohydrate fractioning by the undesired effect of adiabatic heating during grain grinding, or during conventional cooking and also through the encapsulation of already processed monosaccharide's, disaccharides or broken carbohydrate chains in capsules within denaturalized protein matrixes, in order to make their digestion deeper and longer. These processes and procedures allow the ingestion of less restricted portions of food, very similar to the conventional ones while due to their prolonged digestion, naturally limiting the immediate production of glucose (Glycemic Index).

16 Claims, No Drawings

PROCESSING AND COOKING OF FOOD WITH A LOW GLYCEMIC IMPACT FOR THE NUTRITION OF DIABETICS, OBESE AND FOR WEIGHT REDUCING DIETS

CROSS-REFERENCE TO RELATED APPLICATIONS

This application incorporates by reference and claims the benefit of priority to Columbian Patent Application No. 09-027012 filed on Mar. 16, 2009, and is a divisional application of U.S. Provisional Application 12/661,160 filed on Mar. 11, 2010.

SUMMARY

In order to reduce the glycemic load in the daily nutrition of diabetics, obese and weight-reducing diets, this invention claims cooking or baking processes and procedures for conventional food, rich in carbohydrates, in which, the structure of the original complex carbohydrates (amyloses, amylopectin, etc.) is partially preserved; this objective is attained by reducing the magnitude of its fractioning by the undesired effect of adiabatic heating during grain grinding, or during long term conventional cooking, or through the encapsulation of monosaccharides, disaccharides or broken chains of already processed saccharides, in capsules within denaturalized protein matrixes, in order to make their digestion deeper and longer. These processes and procedures allow the ingestion of less restricted portions of food, very similar to the conventional ones (bread, rice, potato, pastas) while due to their prolonged digestion it naturally limits in the immediate production of glucose, generating conditions for appetite satisfaction and a regulated supply of glucose reducing uncontrolled food intake out of hours. This type of food is called "Dieta Profunda" Deep Diet.

BACKGROUND

Technical Field

Diabetes: up to now, constitutes a chronic and incurable disease, characterized by lack of control in the concentration of glucose in blood. The presence of this glucose (glycemia), over the normal values (75 mg/100 cc to 110 mg/100 cc) generates a growing risk of damage in most of the proteins of the body exposed to blood with exaggerated contents of glucose. As a function of its disproportionate concentration and the elapsed time, it ends up destroying, feet capillaries (amputation), while in its culmination, its permanent damage deploys from the degradation of the kidney structure (dialysis) to damages in the ocular retina (blindness). On the other hand, it generates high risk conditions for the cardiovascular system, so that most of the diabetes patients (treated and untreated) come to die due to complications directly associated with its disease. The best estimate for Colombia is that 7% of the population has some degree of diabetes, of which 90% corresponds to "Diabetes Type 2 (T2)" previously known as 'non-insulin-dependent' or 'adult-age diabetes', while the other 10% suffer from Diabetes Type 1 (T1), previously called 'insulin-dependent' or 'child diabetes'.

Diabetes Type 1: the body normally controls the quantity and destination of insulin through the functioning of pancreas; the permanent damage of this organ produces a lack of control called diabetes Type 1 generated by the lack of appropriate production, or lack, of the pancreatic hormone controlling the destination and absorption of glucose, called "insulin". Diabetes T1 must necessarily be treated with external application of such hormone, replacing the function of the organ.

Diabetic T1 patients have a bigger freedom on food consumption, but they must carefully adjust the doses of different types of insulin in its treatment, in order to control in a continuous way the glucose concentration in blood, in accordance to the ingestion of carbohydrates, their type and the exercise done. They also experience, because of the effects of the eventual unused remnants of insulin, the possible reduction in the concentrations of glucose in blood (hypoglycemia) which can induce an enormous weakness and even death. In practice, they are just 0.7% of the population (10% of diabetic patients). Even though their disease type is much more manageable through continuous medication, because of the lack of personal control (knowledge, measurement and interest) in the careful and continuous adjustment of doses, they have a relatively high mortality. For diabetes T1 patients, the control of insulin goes on first place of importance, while diet and exercise go in the second place. Regularity in the ingestion of carbohydrates, obesity and cholesterol control and food remnants of slow digestion food to avoid morning hypoglycemia, are in the case of diabetes T1 patients, the main aims of dieting. :Deep Diet" can be useful to reduce glycemic peaks (both positive and negative) thus facilitating the control of the disease as well as obesity. The "Deep Diet", on these patients, it is useful in a complementary way, but it is not as the main tool for their treatment.

Diabetes Type 2: In Diabetic Type 2 (T2) patients, their pancreas usually keeps on producing variable quantities of insulin, though insulin lacks destination capacity to take glucose into the cells where it must be consumed or transformed. Their body resists the normal and healthy action of insulin. With this lack of control, glucose increases its concentration (glycemia raises), damaging (glycosilating) those body proteins exposed to a 'corrosive blood'. The liver when receiving the vehement call of need from the cells apparently deprived from food, generates even higher quantities of new glucose from its glycogen reserves, which worsens glucose concentration in blood. Even though there are drugs like 'glitazones' and others which temporarily revert resistance of insulin, several recent studies discourage the reduction of the glycemia by this means, given their side effects (Study ACCORD-2008 and others). The drug universally used in this type of diabetes is 'Metformin', which minimizes the production of undesired excess of glucose by the liver.

The most common treatment of Diabetes T2 is therefore, a diet where the ingestion of transformable carbohydrates into glucose is reduced to an acceptance minimum, while the consumption of complex carbohydrates (with a longer digestion) and proteins (that do not directly convert into glucose) is recommended. Fats, which would seem to be an attractive source of calories, are not a practical option, because of their ill effect on the cardiovascular system, weakened by the disease.

The other element of control of this type of diabetes is exercise, which directly consumes the excess of glucose, while improving the state of the cardiovascular system. Diabetes T2 patients wanting to keep a normal level of average glycemia, have to undergo a hungry diet ranging from 1500 to 1600 daily kilocalories, or to eat slightly more, five and up to six times a day in small portions. For them, the traditional amounts of rice, potato, pasta or bread are reduced, in recommended diets, on levels similar to "a third of a cup" while they are replaced with big volumes of legumes and vegetables with a low content of carbohydrates. As this regime is almost impossible to follow, especially if a lot of exercise is done, patients just eat more freely, disobeying the indications from the treating physician, (or being unaware of their disease). In the USA, the percentage of blood hemoglobin damaged by the excess of glucose (or glycosilated: an indicator that renews every three months showing glucose induced damage to the rest of the body) in diabetes patients, is an average of 9.4%, where a value higher to 7% it starts to be worrying with respect to the normal values of healthy people (between 5% and 6%). It is mostly the effect of a 'perverted licentiousness' in diet, generated by the fact that even very high levels of glycemia do not commonly produce immediate symptoms in most cases. With those uncontrolled levels of glucose in blood, a high risk of permanent damage to the different organs of the body it is guaranteed in the medium and long term. In practical terms, it is an unpleasant and cheatable diet with no immediate consequences, which increased the irreversible complications usually leading to a growing risk of damage in all the organs of the body. Statistically, 80% of diabetes patients die prematurely due to those complications induced by their chronic disease. An acceptable diet in social and personal terms, such as the "Deep diet" claimed in this invention, improves life quality and prospects for this 90% of diabetes patients: those with Type 2.

Obesity: constitutes a chronic and progressive disease in the world, which grows as societies acquire a likeness (even with frenzy) for predigested food (there is almost no obesity within primitive peoples). Diabetes patients, as well as healthy people who consume carbohydrates in excess, experiment a process of automatic absorption of the directly consumed glucose (e.g. candies) as well as such generated in the quick digestion of most conventional carbohydrates (bread, cakes, rice, potato, pastas, soft drinks, etc.). Once the new glucose comes into the blood, it can only go two ways, a) it is profitably spent, thanks to the insulin in the different activities of the body (brain, muscles, exercise, functioning, etc.) b) it is stored, either in the form of a small quantity of 'glycogen' in the liver and muscles for an eventual expenditure, or in an unlimited way, as fat produced by the liver for an even slower storage. In its pathologic case, the excess of fat is increasingly stored as deforming adiposities in all the body which distort its metabolism and that worsen the obese life quality. In a perverted way, the continuous ingestion of excessive and regular doses of carbohydrates—almost immediately transformed into glucose—gradually atrophies the capacity to burn fat (to re-transform it into glucose for energetic expenditure) making the obese person to feel a 'continuous hunger' which induces him to live without using the total capacity of its intestinal system, designed for more complex food. The result is the gradual increase in weight, the difficulty to reduce it, the deformation of the body, the increase of multiple diseases associated to obesity, as diabetes itself and the cardiovascular ones, and a general reduction in life expectancy and quality.

Known State of the Technique

Limitations of the conventional diet for diabetes patients T2: as it was said above, "Diabetes T2 patients wanting to have a normal level (of average) glycemia, have to undergo a hunger diet from 1500 to 1600 daily kilocalories, or eating slightly more, five or even six times a day in small portions". Even though there are dugs like 'glitazones' and others, which temporarily revert resistance to insulin, several recent studies discourage the reduction of the glycemia by this means, given their side effects (Study ACCORD-2008 and others). The drug most commonly used in this type of diabetes is 'Metformin', which just minimizes the production undesired glucose excess by the liver.

The most common treatment for Diabetes T2 is, therefore, a diet that reduces to an acceptable minimum the ingestion of carbohydrates transformable directly into glucose, or increasing the consumption of complex carbohydrates (with a longer digestion such as chickpeas) and proteins (that are not transformed directly into glucose). In careful searches, patents that systematically claim decreases in the glycemic load through culinary or industrial food procedures of traditional food were not identified".

T2 diabetics, that constitute 90% of patients, in order to not destroy themselves, must necessarily restrict drastically the ingestion of carbohydrates, especially those that are easily transformed into glucose by the action of the enzyme 'amylase' in saliva and other gastric acids with an immediate action. For example, conventional 'white rice' or "French bread", are transformed, easily and quickly in glucose that passes directly to our blood stream in less than an hour. There is no difference, between the increase in glycemia produced per 50 gr. of 'baguettes' (on a dry base) or by 50 gr. of chemically pure glucose. Furthermore, dietary recommendations such as the consumption of 'dark bread', for example, prove to be almost invalid for the following reasons: a) an 'integral bun' is typically based on mixed 'highly processed flour' to which adds 5% to 15% bran (wheat husks or bran) to make it look like "whole wheat." In practice, it is almost equivalent to 'white bread' used as the prototype of the most undesirable food (base 100 of several rating systems 'Glycemic Index' foods). In practice, the dark colored bun presents a Glycemic Index of 85 to 90. b) For any bread to grow during leavening (to hold the bubbles of carbon dioxide in the process), the baker must typically add 50% (or more) of 'highly processed white flour' (with its complex carbohydrates almost completely fractured due to the adiabatic heating process during milling). Any whole wheat flour (industrial) used to make bread, although includes whole grain particles, but is always, 'highly processed' flour, anyway processed at high adiabatic temperatures which are inherent to the manufacturing process of industrial milling and hence, also easily convertible into glucose by digestion. As a result, most bread recommended in diets, also has a high 'Glycemic Index' of around 70-75 (the immediate impact of glucose=100). For example, a typical whole wheat bun eaten as an only breakfast (no milk, fruit or jam) raises blood sugar of a diabetic full Type 2, (starting at 100 mgr/100 cc in fasting) to 190 mgr/100 cc (measured one hour after eating), when well chewed with saliva, as recommended in all diets. One could imagine the complete result on the patient's blood glucose after breakfast, if the bun is added with 10 gr. Lactose from milk (in coffee), another 10 gr. (Invisible) fructose of a 'no sugar' jam and up to 20 gr. Sugar (quite invisible to the meter) of an orange juice.

By a perverse misfortune, fruit fructose is absorbed and directly enters into the bloodstream of primates in a free faun. It also contributes as the excess of glucose, according to recent studies, to the damage of body-proteins, with an action (not only in its C-1 carbon but also with its C-2 carbon atom) causing far greater damage on proteins in the body that the same amount of glucose. Perversely, fructose is not measured by the glucometer and is not reported in the Glycemic Index of foods. On the other hand, for the consumption of common high in energy goods, with already processed carbohydrates (at the factory or in the pot), such as bread, rice, potatoes or pasta, the only plausible solution, up to now, is eating them in low quantities being replaced with more complex carbohydrates, such as those found in legumes such as soy or chickpeas, granola or those of Chenopodiaceae such as quinoa or amaranth, thereby isolating the patient from traditional food of participation at the family table and thus affecting their quality of life by segregation; thereby, socially inducing to a regular violation of the diet recommended by the treating physician. It has to be remembered that the chronic violation of the recommended diet, rarely results in immediate symptoms, it just accelerates the future and irreversible degradation of the body organs of the diabetic transforming him into a pariah, suffering from all kinds of deadly organ damage, as nephropathy, or neuropathy, or leading to other limitations such as blindness or the loss of toes and even limbs. It's really scary that even doctors, consider natural for most diabetics to die prematurely because of complications arising from their disease, even when handled without discipline, and often by the constraints of adapting their diet to an appropriate exercise level.

Our pre-digested food: it is commonly known that primitive peoples in the Americas, Oceania and Africa, suffer virtually no diabetes; these peoples, when they migrate to effluent civilizations like America, tend to be affected in a few years with T2 diabetes, with incidences equal or even greater than those born in developed countries. The reason is relatively simple, they move from a very similar—or even better—diet, than the one recommended for T2 diabetes patients, to one in which 'pre-digested' "or junk" food is literally processed with saliva.

The six or more meters of intestine, which took more than four million years to develop, from a diet of fruits, buds, flowers and insects, to an open savannah diet based on grains, root vegetables (and meat in the last million and a half years), ceased to be necessary for digestion of most food during the last 150 years. We have reached the limit of consuming pure glucose in sweets, jams and some sodas. The historian Pliny, two millennia ago, reminded us that "although I had never tasted it, it is said that in southern India, Arabia and Ceylon they had an extraordinary food called 'zuccra'." If a conventional T2 diabetic had always fed himself with the nutrition scheme of an Australian aborigine or a Bushman, it would be almost impossible to know that he is diabetic (if he ever would be) unless he was forced to ingest those 75 gr. of glucose of postprandial glycemia test. In other words, T2 diabetes may be visualized (with a lot of medical freedom, however) as an autoimmune disease that manifests itself in the presence of food "careful and perversely predigested", such as sugar, bread, cookies, cakes, rice, potatoes, pizza, fried bananas (plantains), soft drinks . . . Anyway, it is the description of any table in a developed country, with only local variations. Moreover, for non-diabetics, the well directed insulin function, beyond bringing the energy (glucose) to all cells of the body to supply their demands, is to direct all their 'modern surplus of glucose' to the liver to be transformed into transporting triglycerides feeding unlimited reserves of fat (obesity). When the body gets used to operate by subsequent doses of glucose (or modern food that readily transforms into glucose in minutes) the further decline in blood glucose every two hours, will reflect the anxiety for its immediate replacement or in the pathological case: hypoglycemia. We have abandoned almost entirely, the ability to digest foods' primary energy (excluding those consumers of grains with complex carbohydrates such as beans or granola). All the time, we consume soft drinks, biscuits or candies to provide our instant energy needs. Many pass-out in ceremonies and concerns longer than an hour, and we have also lost the ability to easily retransform, fat into glucose. Not surprisingly, obesity with such a diet, has become a widespread and irreversible disease. Obesity, associated with diabetes, is the result of the same cause: a diet that especially in the last 150 years (for 'technological advances' that literally just watch the natural greed of the market') which is industrially predigested or are pre-digested in stoves with infinite fuel: just to make it instantly assimilable: the "The Predigested Diet" now universal in the developed world.

DESCRIPTION

Brief description of the in invention: In order to reduce the glycemic load in the daily nutrition of diabetics, obese and weight-reducing diets, this invention claims processes and procedures for the cooking or baking of conventional food, rich in carbohydrates, in which, the structure of the original complex carbohydrates (amylases, amylopectin, etc.) naturally found in the raw cereal or raw starchy root preserved to a feasible maximum; or the magnitude of its molecular fracture by effect of the adiabatic heating during the milling process, or during prolonged conventional cooking processes, or in the ease of already highly processed short carbohydrates, their direct transformation into glucose is blocked during digestion through their encapsulation in capsules or matrixes of denaturalized protein to make their digestion more prolonged and profound. Food digestion with the above mentioned characteristics, including the development of an appropriate intestinal flora is defined as "Dieta Profunda" Deep Diet.

These processes and procedures allow eating less restricted food portions very similar to the conventional ones (bread, rice, potato, pasta); at the same time, because its prolonged digestion and by its restricted production of immediate glucose, it generates conditions for an appetite satisfaction which reduces food anxiety for food between meals.

The main claims include: a) milling grain for bread, using slow milling stones (or equivalent) to prevent the adiabatic degradation of complex carbohydrates. b) Given that a complex carbohydrate dough has no consistency because of the size of their macromolecules, the encapsulation of carbon dioxide in leavening bubbles of alternate animal or vegetable protein (albumin or gluten). c) Fast cooking followed by fast quenching of foodstuffs like potato or rice, to preserve part of the structure of their complex carbohydrates. d) Encapsulating in denaturalized protein those already short saccharides (processed flour) to prolong their digestion, thus reducing their glycemic impact. In all cases, part of the complex carbohydrates preserved or encapsulated in digestion behave as insoluble fiber, reducing their complete assimilation, enhanced by effect of inhibitors present in the non hydrolyzed carbohydrates.

Detailed description of the invention: "Deep Diet", by recognizing the concept and effects of a "Pre-Digested Diet" conventionally feeding most of the developed world; with this invention claims a series of processes and procedures to process and cook food carbohydrates for a slower and more complex digestion. These are nutrition processes that demand a longer digestion, that resemble those used during millions of years by humans to nourish and naturally, to develop our current digestive system. "Deep Diet's" food (apparently conventional), has a gylcemic load of about one half or less, when compared with their conventional equivalents in the traditional nutrition, with the same appearance, texture and similar taste. These foodstuffs help to better regulate their impact, while the quantities consumed are closer to those accustomed before the illness. On the other hand, when a gradual production of glucose stabilizes over time, it creates a feeling of hunger-satisfaction, thus avoiding anxiety for more energetic food between meals. Login to "Deep Diet"

implies, however, the development of an appropriate intestinal flora for these slowly to digest foods (similar to such flora required to digest granolas or legumes) which can take some time to develop. In cases of other digestive diseases such as diverticulitis, for example, Deep Diet should be totally discouraged, it is therefore highly recommended to consult its convenience with the treating physician. The principles of process and procedure of the "Deep Diet" are:

Principle 1: most of the carbohydrates in our natural good grains (cereals, pseudo-cereals and legumes in Spanish 't.n.') in its natural form, are structured polymers (multiple saccharides molecules, bound to each other like a plastic) which are hardly processed in a short time by animal digestion (have to be gradually 'carved' by enzymes). That is precisely the molecular structure sought by nature to prevent the seeds to easily serve as food. Stone grinding in the primitive "Metate" (two roughly carved stones t.n.) or the fracturing of those grains with our teeth, expose their interior to gastric juices and bacteria, which slowly digest carbohydrates in a process that lasts several hours. Modern industrial mills, on the contrary, raise the temperature of the inner grain by the impact of the hammer or the instantaneous deformation (adiabatic) demanded by ultrafine grinding, fracturing those polymers (complex carbohydrates of the type of amylase, amylopectin, etc.) They fracture significantly into monosaccharides or short polysaccharides (one, two or a few sugar molecules associated, instead of 100 to 50,000). These small processed molecules, by contrast, can be easily transformed into highly assimilable forms in minutes, which are processed almost automatically into glucose by the enzyme amylase in our saliva and other gastric juices. Food from grains, to be healthy in the concept of 'Deep Diet', should be ground (and cooked) with very definite processes, specifically reproducing the way we processed and consumed grains over millions of years, time during which we established our actual digestive system.

Principle 2: carbohydrates in raw starchy roots, tubers and other grains (potato, cassava, rice, quinoa, fractured wheat, etc.) are also polymerized complex starches (amylase, amylopectin, etc.). The extended cooking time in traditional ways (slow hearing, prolonged cooking, slow cooling, reheating, etc.) breaks down these starches into short saccharides making them directly digestible with the saliva. Carefully controlled cooking methods at high temperature and/or high pressure, as well as controlled short time cooking, like for example, sudden chilling, preserve the structure of most of these polymerized starch forms which remain intact (or complex), making its digestion more prolonged along the different stages of the gut, without changing the shape, texture and taste of otherwise traditional food. The rice is still rice, mashed potatoes or lasagna retains their shape, taste and texture, but their digestion is low and complex.

Principle 3: Some highly processed carbohydrates such as pasta flour or bread dough, can be encapsulated in a matrix of denaturalized proteins (such as those found in boiled eggs, or even more solid polymers) so that they demand a greater effort and time to digest in a way similar to those used to digest a protein. These foodstuffs acquire complex carbohydrate properties, even though they contain refined carbohydrates like highly processed flour.

Concepts of use: following the above mentioned principles, over the claims of this invention, procedures and processes, industrial and/or home usable are presented, which allow diabetics (and obese) to be properly nourished with a low glycemic load food. This special food with a presentation and in amounts similar to the conventional (without excess, naturally), has proven to be very similar to conventional food eaten by healthy people. Carbohydrates of "Deep Diet", requiring hours instead of minutes to digest, deliver their nutrients gradually, while allowing the transformation of creation of new nutrients such as vitamin B12 which is naturally synthesized in very deep digestions. "Deep Diet's" food, because its prolonged digestion and production of nutrients, leaves a sense of satisfaction (not bloated) avoiding the tendency to over-eat by anxiety, by both, obese and diabetics. "Deep Diet's" food, when consumed at night, lowers the risk of nocturnal or morning hypoglycemia in T1 diabetic patients by its natural slow digestion. This invention, by nature, offers a lot of this knowledge and procedures for family and domestic processing of foods appropriate for diabetics and obese, that will be disclosed in a future book while claiming and protecting the knowledge and processes claimed at any larger scale, for industrial or commercial exploitation of them when related to diabetic diets, for obesity control and for weight loss.

The objects of this invention are as follows:

Object 1 as Preamble to Objects 2, 3, 4, and 5 below: whole grain cereals and other grain's flour products are recommended in the various diets, because the beneficial effect of their fiber content, but in general, their complex carbs have been already fractured into monosaccharide or short polysaccharides by mechanical and thermo-dynamical processes during their milling, thus making them easily convertible into glucose by the enzyme 'amylase' of saliva and other gastric juices. In order to preserve a significant part of the natural polymeric structures of the starches found in raw grains and cereals (amylopectin, amylase, etc.) and with the specific purpose of reducing their glycemic load impact by immediate absorption of glucose in diabetics or diets, and also to extend their digestion, making it more complex and prolonged, this invention claims a milling process different from the conventional industrial one (hammer or high-speed roller) characterized by grinding stones or other materials that act on the grain at an extreme slow speed and/or slow multi-stages, in which the temperature does not rise inside the grains or their fractions. The goal is not to reach those temperatures that adiabatically break an important part of their natural carbohydrate polymeric structure. Although these slowly ground or crushed products, were part of ancestral food processing, both in our jaw's teeth used as grinding stones, later on primitive two stone hand mills leading to medieval stone mills, the return to their use and mechanical adaptation is claimed, with the specific aim to produce a low-impact modern flours (meals t.n.) destined for low glycemic impact diets for diabetics, hypoglycemic and for obesity and weight reducing diets.

Object 2, In order to implement the First Preamble presented as 'Object 1', cereal grains such as wheat, rye, oats, etc., or pseudo-cereal grains such as quina, amaranth, sunflower seed, or sesame, or grains and legumes such as soy or chickpea, etc. are to be milled for this purpose in processes characterized by braking down those grains in mills, with a flat, cylindrical or conical shape grindstones, both with smooth or grooved stones or with metal grating or grooved teeth, which ensure a slow mechanical milling, preferably in subsequent stages, to avoid adiabatic heating of the grain above 60° C. Preferably with micro-internal temperatures (during the milling operating) of approximately 30° C. The shear speeds between those milling stones or grinding wheels (flat, conical or cylindrical) should be equal or less than 0.3 meters per second (preferably 10 cm. per second)

Object 3, In order to implement the First Preamble presented as 'Object 1.', Protein cereal germs such as 'wheat germ', are to be ground for this purpose in processes characterized by: milling to 30 microns or less in slow mechanical stone mills (flat, conical or cylindrical) and in multiple stages, avoiding their instant adiabatic warming above 45° C. Micro-temperatures during operation of grinding the order 30° C. are preferred. This grinding is done to preserve the stabilization properties of membranes which develop from the hydrolysable proteins that compose them.

Object 4, In order to implement the First Preamble presented as 'Object 1.', Cereal grains, pseudocereals and legumes, that are flattened for this purpose (to preserve complex carbohydrates t.n.) in processes characterized by: slow crushing grain rolls through low speed (less of 0.2 m/seg.) banks, that avoid adiabatic heating above 60° C., preferably temperatures during the compression operation of the order of 30° C.

Object 5, Second preamble for the Objects 6., 7., 8., 9., 10., 11., 12. and 13.: conventional whole grain flours are processed in the same way as highly processed white flour in conventional mechanical mills. In order to make current "dark bread", whole grain flours are mixed in typical ratio of 1:1 with highly processed white flour, to enable the structuring of a dough capable to retain $CO_2$ bubbles during leavening and to allow an elastic matrix structure in bread. The glycemic load of these breads is typically between 75% and 80% of that of 'white bread',—precisely the reference value of the "Glycemic Indices" maximum—. In this preamble, it is darned: baking process characterized by rapid baking systems for breads, cakes and crackers as well as additives that facilitate the retention of $CO_2$ bubbles and/or the elastic structure— thereof, in the process of baking flour made out of whole grains that are very high in complex carbohydrates, a product of the processes claimed in (Objects 1. to 4.) while preserving, to the feasible extent, these complex structures of natural starches in grains. In order to allow the production of a light-weight bread rich in complex carbohydrates (Objects 1. 4.) and with the specific purpose of using them in diabetic and weight control diets, several additives are claimed characterized by the incorporation of soluble protein, protein powder or mucilage (dextrin, etc.) into the dough of flour rich in complex carbohydrates. These additives are common in manufacturing processes of conventional cakes, for example, however, it is exclusively claimed: the use of these proteins and mucilage, for the specific purpose of enabling the manufacture of bread based on those molecularly structured flours (claimed in Objects 1. to 4.) for diabetic and weight control diets, capable of reproducing the physical results (structure and elasticity) of an equivalent (but different) process normally achieved by the kneading and leavening conventional dough produced with highly processed flour. Similarly, the production of flat breads (with forms that are culturally used, such as biscuits), it is claimed, in order to preserve in a meaningful way, the structures of complex carbohydrates (amylopectin, amylase, etc.) during a rapid baking process characterized by the reduction of transient thermal heating. Although these additives are sometimes used in conventional baking processes, their careful use is aimed at specific production of breads made out of modern flours with low glycemic impact, which are unable to retain $CO_2$ bubbles by themselves.

Object 6, In order to implement the Second Preamble presented as 'Object 5.', cereal or legume germs are added in excess to the dough in finely ground powders or in gels, characterized by a 3% to 20% of these additives such as gluten, (with respect to the whole wheat dough) at low temperature, in the manufacture of whole grain bread, cakes and other bakery preparations with high in complex carbohydrates. This addition is done in order to enhance the formation of membrane proteins, during the kneading, leavening and the initial baking of said products, although of course, also will improve their nutritional value.

Object 7, In order to implement the Second Preamble presented as 'Object 5.', soluble proteins characterized by egg albumin, whole egg protein or other soluble proteins are added to the whole grain dough at low temperature, to help encapsulate $CO_2$ bubbles in the manufacture of breads, cakes and other bakery preparations with a high content of complex carbohydrates, in order to facilitate the formation of protein membranes during the leavening process and initial cooking of the products.

Object 8, In order to implement the Second Preamble presented as 'Object 5.', it is claimed the addition of mucilages characterized by edible gel pastes or dextrin pastes in excess of 3% to 15% (with respect to the whole wheat dough) at low temperature, for the specific production of bread, cakes and other bakery preparations high in complex carbohydrates, in order to facilitate the formation of gel membranes during the leavening process and the initial cooking of said products.

Object 9, In order to implement the Second Preamble presented as 'Object 5.', the addition of emulsifiers is claimed, characterized by structures such as lecithin used as an emulsifier of proteins, fats and gels in making bread, cakes and other bakery preparations based on high complex carbohydrate dough, in order to facilitate the formation of membranes during the leavening process and initial cooking of said products.

Object 10, In order to implement the Second Preamble presented as 'Object 5.', The shapes of breads, cakes and other bakery products can be specially adapted to rapid heating processes, characterized by flat profiles, perforated or serrated, in which the transfer of heat is maximized to shorten the heating time and therefore reduce the degradation time of the complex starches.

Object 11, In order to implement the Second Preamble presented as 'Object 5.', accelerated heat transfer processes, specially adopted to fast-channel heat through the complex carbohydrates dough for rapid baking, which are characterized by fins, pins or blades with high them mal conductivity, such as aluminum, introduced into the dough and exposed to oven's radiation and convection.

Object 12, In order to implement the Second Preamble presented as 'Object 5.', fast baking processes which maximize heat transfer are claimed, characterized by the use of hot air moving inside the oven (forced convection) to shorten the heating time and thereby reduce the degradation of complex starches.

Object 13, In order to implement the Second Preamble presented as 'Object 5.', Breads, cakes and other bakery products can be pre-baked or fully baked by the action of microwave ovens to minimize cooking time in order to protect the polymerized structures of their complex starches.

Object 14, Third preamble of the Objects 15., 16., 17., 18., 19. and 20: "preservation during cooking, of the structures of complex polysaccharides (eg amylase or amylopectin) found in tubers or grains during coking of food, in order to slow and make more complex their digestion and assimilation by diabetic and obese". The preservation of such complex structures is characterized by rapid cooking at or above atmospheric pressure followed by a sudden chilling. Note: Although some of these operations are sometimes used in food industry processes, their use is specifically claimed when they are carefully aimed to produce low glycemic load foods to be commercialized as special diets for diabetics, obese or weight reducing diets.

Object 15, In order to implement the Third Preamble presented as 'Object 14.' special geometries of the products to be processed are claimed informs characterized by the fractioning of said tubers and other products, to be cut into small pieces, grated or sliced, before their quick-cooking, in order to accelerate the process of controlled heating and cooling thereof. Said products are fractioned in small pieces in order to reduce to a minimum their thermal transients, thus quickly reaching their controlled cooking temperature to preserve the complex structures of their carbohydrates.

Object 16, In order to implement the Third Preamble presented as 'Object 14.' rapid internal heating processes are claimed; those processes are characterized by the use of microwave ovens to swiftly preheat the inner part of the fractioned product to enhance pre-raise of the temperature of the products to be cooked in other processes, thereby avoiding long warm-up times that tend to degrade the polymeric structure of their starches.

Object 17, In order to implement the Third Preamble presented as 'Object 14.' rapid internal heating processes of the products are claimed, characterized by the use of microwave ovens for a full micro-cooking in the oven, within a time frame that minimizes the splitting of complex polysaccharides of the dough.

Object 18, In order to implement the Third Preamble presented as 'Object 14.' the violent and short-term cooking is claimed, when carefully controlled, characterized by the minimization (compatible with the texture and digestibility of each food), of heating/or cooling times through various ways with hot or cold water baths, of the small chunks, grated or sliced pieces of tubers and other products, swiftly downloaded into boiling pots and pans, usually with boiling water (and preferably over products previously pre-heated short time in microwave) or in a bowl of boiling water, to minimize cooking time appropriate for the purposes stated in the Third Preamble (14.).

Object 19 In order to implement the Third Preamble presented as 'Object 14.' the violent and short-term cooking is claimed when carefully controlled, characterized by the minimization (compatible with the texture and digestibility of each food) of its hearing times and/or sudden cooling of small grains such as rice, quina, grains or flakes, chips, scratches or slices of tubers and other similar products in pressure kettles during times under 14 minutes of pressurized boiling in order to minimize an adequate cooking time for the purposes slated in the Third Preamble (14.).

Object 20, In order to implement the Third Preamble presented as 'Object 14.' a rapid quenching of the cooked products is claimed, characterized by an immersion or spray with cold water or cold brown air blowing or expanding gases, or "flash freezing" of those products cooked according to the techniques presented in the four previous objects (15., 16., 17., 18. and 19.), in order to stop the structural degradation processes of their complex carbohydrates after controlled cooking processes.

Object 21. Fourth preamble of the Objects 21., 22., 23., 24., 25., 26., 27., 28. and 29: highly processed carbohydrates (monosaccharides, disaccharides, oligosaccharides and short chains) are to be encapsulated to hinder or prolong their digestibility. This process is characterized by: the addition or creation of matrices, capsules or spongy structures of denaturalized proteins (solidified and insoluble) to slower digestion of the complex saccharides-matrix, requiring therefore a deeper digestive process (than the simple amylase) through the action of proteolytic enzymes in the intestinal tract. These enzymes are sequentially secreted by the stomach, pancreas and small intestine. Thus, those readily digestible carbohydrates into glucose, or easily convertible are delayed in their absorption and sometimes behave as insoluble fibers. Alternatively the ability of fats to delay transformation into and/or absorption of glucose; it has been demonstrated, in processes characterized by: the encapsulation of highly processed carbohydrates or sugars (monosaccharides, disaccharides, oligosaccharides, etc.). Fat slows digestion, hereby reducing glycemic load. Note: Although some of these operations are sometimes used in processes of the food industry (such as puff pastry), specifically its use is claimed to produce low glycemic load foods to be specifically marketed as special diets for diabetics, obese or body weight reduction diets.

Object 22 In order to implement the Fourth Preamble presented as 'Object 21.' the dry baking of conventional pasta to 'passivate' it, characterized by: the baking of pasta-with high content of soluble protein-for three minutes or more in an oven (preferably for 60 to 100 minutes) at temperatures between 43° C. and 110° C. (preferably about 70° C.) in a process in which those proteins from the eggs and semolina are denaturalized; those proteins always present as a soft matrix within the structure of a good quality pasta, are to be transformed (by said baking t.n.) into a polymer of minimum digestibility, increasing thereby the digestive processing time of otherwise shorter carbohydrates from highly processed flour. Some of these protein-saccharide sets, just behave as insoluble fiber through the whole digestive process.

Object 23 In order to implement the Fourth Preamble presented as 'Object 21.' pasta with relevant content in its original dough with eggs and semolina can be fried in oil in order to be 'passivated' in processes characterized by a denaturalization of the protein content of egg ad protein in semolina as a direct effect of the high frying temperature of the dry or slightly humid pasta, thus generating a matrix that encapsulates the short saccharides of flour for sufficient time to reduce their Glycemic Index. Pasta processed according to the processes claimed in the two previous Objects [22, and 23.] is defined as "passivated pasta" when their refined or short carbohydrates have been partially encapsulated in protein.

Object 24, In order to implement the Fourth Preamble presented as 'Object 21.' the extension of conventional cooking (in boiling water) of pasta (spaghetti or lasagna) when previously passivated, characterizes by increase in boiling or baking time up to 20-40% over conventional cooking of fresh pasta, in order to soften its internal structure to reach an equivalent conventional texture.

Object 25, In order to implement the Fourth Preamble presented as 'Object 21.' The addition of proteins capable of being denaturalized, characterized by significant quantities in the order of 3% to 20% egg, egg whites, gluten or other proteins in bread dough or cakes, to encapsulate specific short carbohydrate fractions (monossaccharides, disaccharides, oligosaccharides, etc.) as well as to promote stability of the membranes that enclose the carbon dioxide during leavening and at the initial part of cooking or baking. It specifically claimed: the effect of short saccharides encapsulation by this means, even in recipes that traditionally have used the egg to provide flavor or texture to said products.

Object 26, In order to implement the Fourth Preamble presented as 'Object 21.', it is claimed: the addition of disproportionate amounts of egg or egg white (to reduce saturated fat) to the dough of cakes and cookies to encapsulate fractions of short carbohydrate (monodisaccharides, oligosaccharides, etc.).

Object 27, In order to implement the Fourth Preamble presented as 'Object 21.', the pre-baking of semi-moist cooking for 5 minutes or more (preferably 30 minutes) of dough in conventional food such as pizza, characterized by the addition of soluble protein loads (eg egg white or gluten) the order of 3% to 20% by weight, at temperatures between 43° C. to 150°

C. (preferably about 60° C.) temperatures at which, proteins from egg and semolina are denaturalized (polymerize t.n.) around short saccharides, thus reducing the digestibility of the product, previous to subject it to conventional baking.

Object 28 (repeats Object 27 t.n.) In order to implement the fourth Preamble presented as 'Object 21.', the pre-baking or semi-moist cooking for 5 minutes or more (preferably 30 minutes) of dough in conventional food such as pizza, characterized by the addition of soluble protein loads (eg egg white or gluten) the order of 3% to 20% by weight, at temperatures between 43° C. to 150° C. (preferably about 60° C.) temperatures at which, proteins from egg and semolina are denaturalized (polymerize t.n.) around short saccharides, thus reducing the digestibility of the product, previous to subject it to conventional baking.

Object 29, In order to implement the fourth Preamble presented as 'Object 21.', the emulsification of fats, proteins and gels in pasta and other dough mixes such as pizza dough, characterized by the addition of lecithin to provide during the kneading and initial baking, the encapsulation of highly processed short saccharides, in protein or fat matrixes with more compact features.

I claim:

1. A method for producing low glycemic index baked products, the method comprising:
    milling a grain at a shear speed of less than 0.3 m/sec, wherein during the milling the internal temperatures of the grain do not exceed 60° C.;
    preparing a dough including the milled grain;
    adding protein to the dough, wherein the protein is at least one of egg whites, gluten, semolina, or combinations thereof, wherein the protein is added to the dough in an amount between, and including, 3% to 20% by weight with respect to the dough; and
    baking the dough in an oven between, and including, 5 minutes to 30 minutes, wherein the baking denatures the added protein, wherein the denatured protein encapsulates a portion of carbohydrates within the dough.

2. The method of claim 1 wherein the protein is egg whites, wherein the egg whites are added in an amount between, and including, 3% to 20% by weight with respect to the dough.

3. The method of claim 1 further comprising applying hot forced air during baking.

4. The method of claim 1 wherein the dough is a pasta dough, wherein, after baking, the method further includes boiling the baked pasta.

5. The method of claim 1 wherein the dough includes quinoa, amaranth, sunflower seed, sesame, legumes, or combinations thereof.

6. The method of claim 1 wherein, during milling, the internal temperatures of the grain does not exceed 30° C.

7. The method of claim 1 wherein the milling includes a shear speed of less than 0.2 m/sec.

8. The method of claim 1 wherein the milling includes a shear speed of less than 10 cm/sec.

9. The method of claim 1 further comprising adding a mucilage to the dough, wherein the mucilage is in the form of an edible gel paste or dextrin paste, wherein the mucilage is added in an amount of 3% to 15% by weight, with respect to the dough.

10. The method of claim 1 further comprising adding an emulsifier to the dough.

11. The method of claim 10 wherein the emulsifier is lecithin.

12. The method of claim 1 wherein the baking is performed in a convection oven.

13. The method of claim 1 further comprising pre-heating the dough in a microwave oven.

14. The method of claim 1 wherein the baking is performed in a microwave oven.

15. The method of claim 1 wherein the milling includes using cylindrical or conical shape grindstones.

16. The method of claim 1 further including adding a partially milled grain to the dough, wherein the partially milled grain is a size between, and including, 0.1 mm to 2 mm.

* * * * *